United States Patent [19]

Barber

[11] 3,748,003
[45] July 24, 1973

[54] MULTIPLE ELEMENT BEARING SEAL
[75] Inventor: Richard H. Barber, Valparaiso, Ind.
[73] Assignee: McGill Manufacturing Company, Inc., Valparaiso, Ind.
[22] Filed: Nov. 1, 1971
[21] Appl. No.: 194,641

[52] U.S. Cl.............. 308/187.2, 277/65, 277/94, 277/95
[51] Int. Cl..................... F16c 33/76, F16c 33/80
[58] Field of Search............... 308/187.1, 187.2; 277/53, 65, 84, 94, 95

[56] References Cited
UNITED STATES PATENTS

| | | | |
|---|---|---|---|
| 3,396,977 | 8/1968 | Iguchi | 308/187.2 |
| 3,361,497 | 1/1968 | Stengel | 308/187.2 |
| 3,090,628 | 5/1963 | Giulietti | 277/94 |
| 3,368,853 | 2/1968 | VanWyk et al. | 277/94 |
| 3,473,856 | 10/1969 | Helms | 277/94 |

Primary Examiner—Charles J. Myhre
Assistant Examiner—Barry Grossman
Attorney—Foorman L. Mueller et al.

[57] ABSTRACT

A bearing seal in which a first annular ring of resilient nonmetallic material is positioned in oppositely disposed grooves in the inner and outer racerings of the bearing assembly. A second annular sealing ring of resilient non-metallic material has one edge positioned in one of the grooves with the first sealing ring. The outer edge extends axially outwardly of the bearing assembly and rests on the corner face of the other racering in a contact seal. The first ring is vented so that during the relubrication process lubricant bleeds past the ring and lifts the face of the second sealing ring off the corner face of the racering to permit the lubricant to escape outside the bearing assembly thereby relieving internal pressure from the lubricant holding space.

6 Claims, 4 Drawing Figures

Patented July 24, 1973
3,748,003
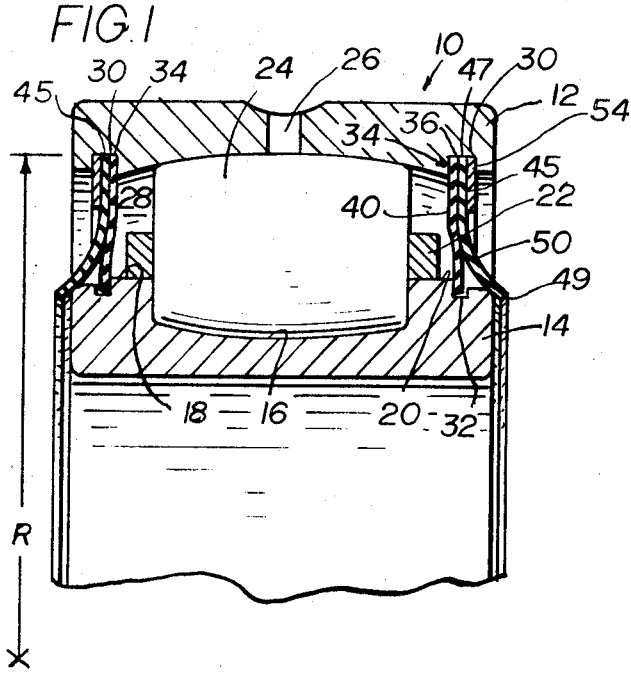
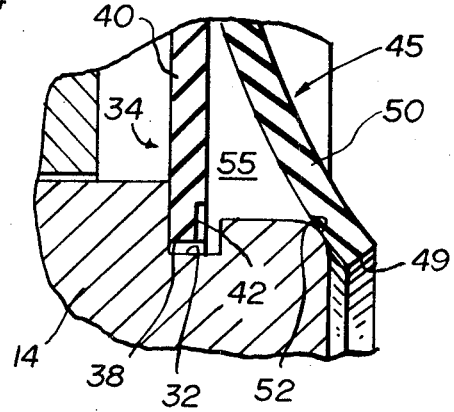
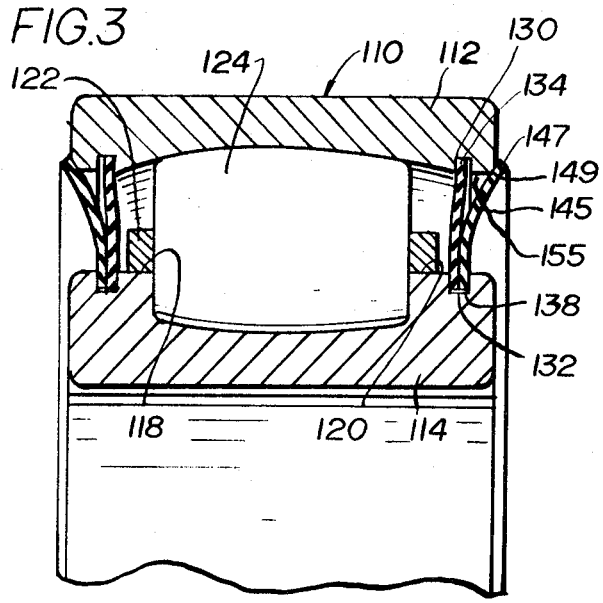
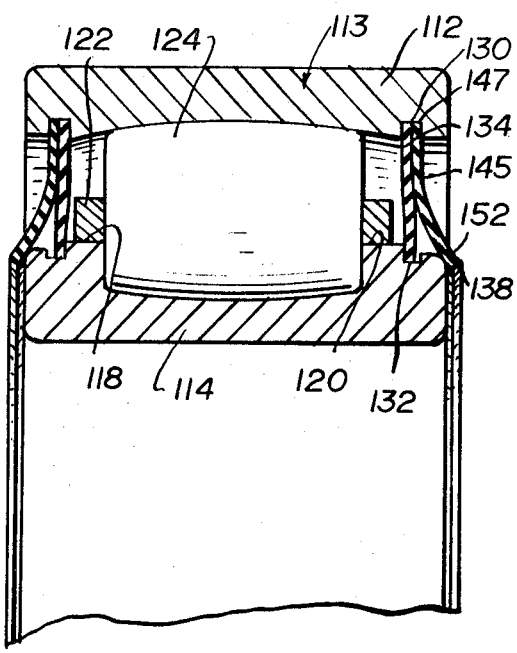
INVENTOR
RICHARD H. BARBER
BY Mueller & Aichele
ATTORNEYS.

MULTIPLE ELEMENT BEARING SEAL

BACKGROUND OF THE INVENTION

The sealing of lubricant holding spaces beween the inner and outer racerings in bearing assemblies to prevent the introduction of foreign material therein is a continuing problem. In some critical applications, for instance in a very dusty or otherwise polluted atmosphere, a single sealing element can be inadequate. Multiple element seals have been proposed but in at least one known instance they provided such a tremendous drag on the surface of the racerings that operation of the bearing was impaired.

In still another example of a multiple element seal the sealing elements were positioned in the bearing raceways in a manner which prevented relubrication of the bearing in an operating assembly without literally blowing the seals from the bearing

SUMMARY OF THE INVENTION

It is an object of this invention to provide an improved multiple element bearing seal.

It is another object of this invention to provide a multiple element bearing seal which permits relubrication of the lubricant holding space of the bearing.

It is a further object of this invention to provide an improved multi-element seal which permits the desired relatively unimpaired motion between the inner and outer bearing racerings.

In one embodiment of this invention, a bearing assembly has an inner member and an outer member which are relatively rotatable and which are spaced apart for receiving anti-friction elements and lubricant therebetween. Each of the members has an annular groove in a corresponding outboard axial end thereof, which grooves are oppositely disposed from one another. A seal for sealing the space between the members to prevent the introduction of foreign matter into the lubricant includes first and second annular sealing rings of a resilient nonmetallic material each having an outer peripheral edge and an inner annular edge defining a radial body portion. The first annular sealing ring is positioned in the bearing assembly with the outer peripheral edge fitting into the annular groove in the outer member and the inner annular edge fitting into the annular groove in the inner member, with the radial body portion of the ring extending across the space between the members. The second annular sealing ring is positioned in the bearing assembly with one of the outer peripheral and inner annular edges being fit into the annular groove in a selected one of the inner and outer members with the first sealing ring, and the other of the edges extend axially outwardly of the bearing assembly with the radial body portion extending across the space between the members and impinging against a corner face of the nonselected member in a running contact seal therewith.

The first sealing ring may include a vent whereby with increased internal pressure in the lubricant holding space between the inner and outer members during the relubricating operation the vent permits the lubricant to bleed past the sealing ring. The lubricant bleeding past the sealing ring forces the radial body portion of the second sealing ring away from contact with the corner face of the nonselected member to permit the lubricant to escape from the bearing assembly thereby relieving the internal pressure in the lubricant holding space and preventing the seals from being blown from the bearing assembly.

DESCRIPTION OF THE DRAWING

FIG. 1 is an elevation view partially in cross-section of a bearing sealed in accordance with this invention;

FIG. 2 is an exploded view partially in cross-section of a portion of the bearing assembly of FIG. 1;

FIG. 3 is an elevation view partially in cross-section of a bearing assembly illustrating a further embodiment of the bearing seal; and FIG. 4 is an elevational view partially in cross-section of a bearing assembly illustrating still another embodiment of the seal in accordance with this invention.

DETAILED DESCRIPTION

Referring to the drawing, FIGS. 1 and 2 show a bearing assembly 10 which includes an outer member or racering 12 and an inner member or racering 14 which are rotatable relative to one another. The inner racering 14 includes a bearing raceway 16 defined by the land portions 18 and 20. A cage member 22 rides on the lands 18 and 20 and acts as a retainer for the anti-friction members or spherical rollers 24. The rollers are guided in the raceway 16 by the land shoulders. A lubricating duct 26 is provided to introduce lubricant into the lubricant holding space 28 between the inner and outer racerings.

First and second radially extending grooves 30 and 32 are oppositely disposed from one another in the inner and outer racerings respectively. Since the sealing elements in each axial end of the bearing are identical, a description will be given for only one axial end of the bearing with the understanding that it applies equally to the opposite axial end.

A first annular sealing ring 34 of a resilient nonmetallic material such as nylon having an outer peripheral edge 36 and an inner annular edge 38 (FIG. 2) defining a radial body portion 40 is positioned in the bearing assembly, with the outer peripheral edge 36 fitting into the groove 30 and the inner annular edge 38 fitting into the groove 32. The radial body portion of the annular ring extends across the lubricant holding space of the bearing assembly 10. As can be seen in FIG. 2, the annular sealing ring 34 includes identations 42 about the radial body portion at the inner annular edge. These indentations act as vents to permit lubricant from the lubricant holding space 28 to escape around the inner annular edge 38 of the ring 34 with the bearing being relubricated to prevent a buildup of pressure in the lubricant holding space. The construction of this ring 34 and the operation of the same during relubrication can be found in greater detail in U. S. Pat. No. 3,361,497, issued Jan. 2, 1968 to the assignee of this application.

A second annular sealing ring 45 of resilient nonmetallic material also has an outer peripheral edge 47 and an inner annular edge 49 which defines a radial body portion 50. This ring is mounted in the bearing assembly by fitting the outer peripheral edge into the groove 30 in the outer racering with the ring 34. The inner annular edge 49 is positioned axially outwardly of the lubricant holding space 28 across the space between the bearing racerings and is seated in a running contact fit on the corner face 52 of the inner racering 14. To complete the structure a snap ring 54 is fit into the groove 30 and acts to hold the annular sealing rings 34 and 45 in the groove 30 as well as to insure that the inner and outer racerings of the bearing are maintained as a unit. It should be noted that snap ring 54 is not necessary to hold the sealing ring in the groove 30, and this could be accomplished by making the groove itself of a predetermined width substantially equal to the thickness of the sealing rings.

Once more referring to FIG. 1 the radius R of the outer peripheral edge of each of the sealing rings 34 and 45 is selected such that it is substantially equal to the radius to the bottom of the groove 30 so the outer peripheral edge of the rings 34 and 45 fit in a substantially line-to-line radial fit in the groove. The radial dimension of the body portion 40 is then chosen so the inner annular edge 38 of the ring 34 is in a clearance radial fit in the groove 32. This insures that the inner and outer racerings are free to move relative to one another with the sealing rings providing minimal drag. The dimension of the radial body portion 50 of the ring 45 is chosen so that it is larger than the dimension of the body portion of ring 34 and the radial space between the racerings 12 and 14.

The sealing ring 34 therefore makes a contact seal with the wall of the groove 30 and a labyrinth-type seal in the groove 32. The sealing ring 45 likewise makes a contact seal in the groove 30 and extends axially outwardly to make a running contact seal with the corner surface 52 of the inner racering 14. In addition to providing a running contact seal, the ring 45 also acts as a dam to retain lubricant in the void 55 (FIG. 2) between the rings 34 and 45. This lubricant which for example could be grease then acts as an additional labyrinth seal which makes the multi-element seal even more effective.

During relubrication of the bearing in an operating installation the lubricant is forced under pressure into the channel 26 where it enters the lubricant holding space. As the pressure mounts in the lubricant holding space the grease vents around the bottom of the sealing ring 34 into the void space 55 between the rings 34 and 45. As the pressure increases in the void 55, the sealing ring 45 is lifted from its seat on the corner face 52, permitting the lubricant to escape outside the bearing assembly thereby relieving the pressure in both the lubricant holding space 28 and the void 55 to insure that the seals remain seated.

Referring to FIG. 3 there is shown a prelubricated bearing 110 which has racerings 112 and 114 which are spaced apart for sealing the spherical rollers 124. The rollers are guided by the inner raceway lands 118 and 120 and retained by the cage 122 in a fashion similar to the bearing shown in FIG. 1. In this arranement the multiple element seal includes the annular sealing ring 134 which is mounted in the oppositely disposed radial grooves 130 and 132 in a manner similar to that described for sealing ring 34. The other sealing ring 145 of the multi-element seal, which is similar to sealing ring 45, is mounted by inserting the inner annular edge 138 of the ring in the groove 132 with the outer peripheral edge 147 extending axially outwardly of the bearing assembly and engaging the corner face 149 of the outer racering 112 in a running contact fit. The sealing ring 145 in addition to providing a contact seal on the corner face 149 of the racering 112, also acts as a dam for grease in the void 155 between the rings 134 and 145. The multiple element seal thus described performs a sealing function in the same manner as described for the multi-element seal of the bearing assembly 10.

Referring to FIG. 4, there is shown prelubricated bearing assembly 113 similar to that shown in FIG. 3 and like parts are given like numbers. Sealing ring 134 is mounted in a bearing assembly 113 in the same manner as sealing ring 134 in the bearing assembly 110 in this bearing the other annular sealing ring 145 is mounted with the other peripheral edge 147 thereof fitting into the groove 130 and the inner annualr edge 138 extending axially outwardly of the bearing assembly and seated on corner face 152 of the inner race-ring 114. The multi-element seal of the bearing assembly 113 performs the sealing function in a manner similar to that described for bearing assembly 110.

What has been described, therefore, is a unique multi-element seal for a bearing assembly which does not interfere with the relative rotation of the movable parts of the bearing and which permits relubrication of the bearing while in an operating installation.

I claim:

1. In a bearing assembly having an inner member and an outer member which are relatively rotatable and which are spaced apart for receiving anti-friction elements and lubricant therebetween, each member having an annular groove in a corresponding outboard axial end thereof which grooves are oppositely disposed from one another, the combination including sealing means for sealing the space between the members to prevent the introduction of foreign matter into the lubricant, said sealing means comprising first and second annular resilient sealing rings each having an outer peripheral edge and an inner annular edge defining a radial body portion, said first annular sealing ring being positioned in the bearing assembly with said outer peripheral edge fitting into the annular groove in the outer member and said inner annular edge fitting into the annular groove in the inner member, with said radial body portion extending across the space between the members, said second annular sealing ring being positioned in the bearing assembly with one of said outer peripheral and inner annular edges being fit into the annular groove in a selected one of the inner and outer members, and the other of said edges extends axially outwardly of the bearing assembly with said radial body portion extending across the space between the members and impinging against the nonselected member in a running contact seal therewith and said first sealing ring includes venting means whereby with increased internal pressure in the lubricant holding space between the inner and outer member during a relubricating operation said venting means permits the lubricant to bleed past said sealing ring, and said lubricant bleeding past said sealing ring forces said radial body portion of said second sealing ring impinging against the nonselected member away from contact with said nonselected member to permit the lubricant to escape from the bearing assembly thereby relieving the internal pressure in the lubricant holding space.

2. The bearing assembly of claim 1 wherein said second annular sealing ring is positioned in the bearing assembly with said outer peripheral edge fitting into the annular groove in the outer member and said inner annular edge extending axially outwardly of the bearing assembly with said axial body portion thereof impinging against the inner member.

3. The bearing assembly of claim 1 wherein said second annular sealing ring is positioned in the bearing assembly with said inner annular edge fitting into the annular groove in the inner member and said outer annular edge extending axially outwardly of the bearing assembly with said radial body portion thereof impinging against the outer member.

4. The bearing assembly of claim 1 wherein said radial body portion of said first sealing ring has a radial dimension such that said outer peripheral edge and said inner annular edge fit in a close running fit with the bottom of the respective grooves in which they ride, and said radial body portion of said second sealing ring has a radial dimension greater than said first sealing ring so the same can extend axially outwardly of the bearing assembly and impinge on said nonselected member.

5. The bearing assembly of claim 1 wherein said first and second sealing rings mounted in said selected one of said inner and outer members have an axial thickness substantially equal to the width of said groove so the same fit tightly therein, and said axial thickness of said first sealing ring mounted to said nonselected member is less than the width of said groove so the same is free to move therein.

6. In a bearing assembly, the sealing structure for sealing the lubricant carrying portion of the bearing assembly against the introduction of foreign matter into the same, the bearing assembly including inner and outer racerings and first and second radially extending annular grooves oppositely disposed from one another in the inner and outer racerings respectively, and wherein the sealing structure comprised first and second annular resilient sealing rings each having an outer peripheral edge and an inner annular edge defining a radial body portion, said first sealing ring being positioned with said outer peripheral edge in the groove in the outer racering and the inner annular edge being positioned in the groove in the inner racering with the radial body portion extending between the grooves to form a labyrinth type seal for the lubricant carrying portion of the bearing assembly, said second sealing ring being positioned in the bearing assembly with one of said outer peripheral and inner annular edges being fit into the groove in a selected one of the inner and outer racerings, with said first sealing ring, and the other of said edges extends axially outwardly of the bearing assembly with said radial body portion thereof impinging on the corner face of the nonselected racering in a running fit therewith to provide a contact seal which cooperates with said labyrinth seal of said first sealing ring to seal the assembly against foreign matter entering the lubricant holding space, and said first sealing ring includes venting means whereby with increased internal pressure in the lubricant holding space during a relubricating operation said venting means permits the lubricant to bleed past said sealing ring, and said lubricant bleeding past said sealing ring forces said radial body portion of said second sealing ring from its seat on said corner face of said nonselected racering to permit the lubricant to escape from the bearing assembly thereby relieving the internal pressure in the lubricant holding space, said radial body portion of said second sealing ring with the same being seated on said corner face of said nonselected racering further acting as a dam to maintain lubricant between said first and second sealing rings to provide a lubricant labyrinth seal for the bearing assembly.

* * * * *